United States Patent [19]
Joseph

[11] Patent Number: 5,258,220
[45] Date of Patent: Nov. 2, 1993

[54] WIPE MATERIALS BASED ON MULTI-LAYER BLOWN MICROFIBERS

[75] Inventor: Eugene G. Joseph, Arden Hills, Minn.

[73] Assignee: Minnesota Mining and Manufacturing Company, St. Paul, Minn.

[21] Appl. No.: 768,156

[22] Filed: Sep. 30, 1991

[51] Int. Cl.⁵ .................................. B32B 27/00
[52] U.S. Cl. ........................... 428/284; 428/286; 428/287; 428/297; 428/298; 428/373; 428/903; 428/913
[58] Field of Search ............... 428/373, 370, 374, 375, 428/378, 395, 396, 901, 903; 418/284, 297, 298, 286, 287, 913

[56] References Cited

U.S. PATENT DOCUMENTS

| | | | |
|---|---|---|---|
| 3,480,502 | 11/1969 | Schrenk | 156/271 |
| 3,487,505 | 1/1970 | Chisholm et al. | 18/13 |
| 3,557,265 | 1/1971 | Chisholm et al. | 264/47 |
| 3,672,802 | 6/1972 | Matsui et al. | 425/131.5 |
| 3,681,189 | 8/1972 | Matsui et al. | 428/373 |
| 3,825,379 | 7/1974 | Lohkamp et al. | 425/72 |
| 3,841,953 | 10/1974 | Lohkamp et al. | 161/150 |
| 3,849,241 | 11/1974 | Butin et al. | 161/169 |
| 3,855,046 | 12/1974 | Hansen et al. | 161/150 |
| 3,971,373 | 7/1976 | Braun | 128/146.2 |
| 3,973,068 | 8/1976 | Weber | 428/198 |
| 4,100,324 | 7/1978 | Anderson et al. | 428/288 |
| 4,103,058 | 7/1978 | Humlicek | 428/171 |
| 4,117,194 | 9/1978 | Barbe et al. | 428/374 |
| 4,118,531 | 10/1978 | Hauser | 428/224 |
| 4,295,809 | 10/1981 | Mikami et al. | 425/72 S |
| 4,307,143 | 12/1981 | Meitner | 252/91 |
| 4,323,534 | 4/1982 | DesMarias | 264/176 R |
| 4,375,718 | 3/1983 | Wadsworth et al. | 29/592 E |
| 4,426,417 | 1/1984 | Meitner et al. | 428/195 |
| 4,429,001 | 1/1984 | Kolpin et al. | 428/283 |
| 4,436,780 | 3/1984 | Hotchkiss et al. | 428/198 |
| 4,460,649 | 7/1984 | Park et al. | 428/373 |
| 4,578,414 | 3/1986 | Sawyer et al. | 524/310 |
| 4,657,802 | 4/1987 | Morman | 428/152 |
| 4,729,371 | 3/1988 | Krueger et al. | 128/206.19 |
| 4,753,843 | 6/1988 | Cook et al. | 428/286 |
| 4,755,178 | 7/1988 | Insley et al. | 604/367 |
| 4,766,029 | 8/1988 | Brock et al. | 428/286 |
| 4,818,463 | 4/1989 | Buehning | 264/40.1 |
| 4,904,521 | 2/1990 | Johnson et al. | 428/284 |
| 4,908,263 | 3/1990 | Reed et al. | 428/286 |
| 4,939,008 | 7/1990 | Komaki | 428/34.3 |
| 4,964,509 | 10/1990 | Insley et al. | 206/204 |
| 4,986,743 | 1/1991 | Buehning | 425/7 |
| 5,169,706 | 12/1992 | Collier et al. | 428/903 |

FOREIGN PATENT DOCUMENTS 0370835  5/1990  European Pat. Off.

OTHER PUBLICATIONS

Wente, Van A., "Superfine Thermoplastic Fibers", *Industrial Engineering Chemistry*, vol. 48, pp. 1342-1346.

Wente, Van A. et al., "Manufacture of Superfine Organic Fibers", Report No. 4364 of the Naval Research Laboratories, published May 25, 1954.

*Primary Examiner*—James J. Bell
*Attorney, Agent, or Firm*—Gary L. Griswold; Roger R. Tamte; William J. Bond

[57] ABSTRACT

An absorbent wipe material formed from microfibers having multiple layers of an elastomeric material and a non-elastomeric material.

8 Claims, 5 Drawing Sheets

WIPE MATERIALS BASED ON MULTI-LAYER BLOWN MICROFIBERS

FIELD OF THE INVENTION

The invention relates to wipe material and more specifically to a wipe that will increase in its absorptive capacity when stretched. The novel wipe is formed of nonwoven webs including melt-blown microfibers comprised of longitudinally distinct polymeric layers of at least one elastomeric material and a second higher modulus or non-elastomeric material.

BACKGROUND OF THE INVENTION

It has been proposed in U.S. Pat. No. 3,841,953 to form nonwoven webs of melt blown fibers using polymer blends, in order to obtain webs having novel properties. A problem with these webs however is that the polymer interfaces causes weaknesses in the individual fibers that causes severe fiber breakage and weak points. The web tensile properties reported in this patent are generally inferior to those of webs made of corresponding single polymer fibers. This web weakness is likely due to weak points in the web from incompatible polymer blends and the extremely short fibers in the web.

A method for producing bicomponent fibers in a melt-blown process is disclosed in U.S. Pat. No. 4,729,371. The polymeric materials are fed from two conduits which meet at a 180 degree angle. The polymer flowstreams then converge and exit via a third conduit at a 90 degree angle to the two feed conduits. The two feedstreams form a layered flowstream in this third conduit, which bilayered flowstream is fed to a row of side-by-side orifices in a melt-blowing die. The bi-layered polymer melt streams extruded from the orifices are then formed into microfibers by a high air velocity attenuation or a "melt-blown" process. The product formed is used specifically to form a web useful for molding into a filter material. There is not disclosed a stretchable, high loft, and preferably high strength web.

U.S. Pat. No. 4,753,843 (Cook et al) discloses a multi-layer nonwoven web, generally melt-blown polypropylene, where the outer layers are rendered hydrophilic by spraying on a surfactant. The center layers remain hydrophilic. The web is designed to provide wipes that will absorb both aqueous liquids and oils without streaking. Another multi-layer web is discussed in U.S. Pat. No. 4,436,780 (Hotchkiss). In Hotchkiss, only the center layer is a nonwoven web with outer layers of a continuous filament spun bond web. The use of a surfactant is discussed but apparently not exemplified. The web allegedly displayed improved streak free performance over similar prior art webs (FIG. 4) and both oil and water absorbency attributed primarily to the nonwoven web layer.

A single layer wipe using melt-blown microfibers is described in U.S. Pat. No. 4,426,417 (Meitner et al) where staple and cotton fibers are incorporated into the web. Better clean wiping is attributed to the staple and cotton fibers as is improved strength over comparable webs using added pulp as discussed in U.S. Pat. No. 4,100,324 (Anderson et al). This provides an allegedly low density web compared to pure nonwoven webs.

Although the above webs provide varying desirable combinations of properties, there are still needs to provide webs of improved properties (such as strength, absorbance capacity, etc.) or similar properties by improved or similar processes. For example, it can be difficult to incorporate stable and cotton fibers into a web as discussed by Meitner et al in Pat. No. 4,426,417 while expected variations in raw materials can lead to unwanted variability in web performance.

BRIEF SUMMARY OF THE INVENTION

The present invention is directed to a web for use in high performance wipe applications. The nonwoven web produced from longitudinally layered melt-blown microfibers comprising layers of a low modulus or elastomeric materials and adjacent layers of high modulus or nonelastic materials. The microfibers can be produced by a process comprising first feeding separate polymer melt streams to a manifold means, optionally separating at least one of the polymer melt streams into at least two distinct streams, and combining all the melt streams, including the separated streams, into a single polymer melt stream of longitudinally distinct layers, preferably of the at least two different polymeric materials arrayed in an alternating manner. The combined melt stream is then extruded through fine orifices and formed into a highly conformable and stretchable web of melt-blown microfibers. The web when stretched shows an increase in loft and significant increases in water uptake.

DESCRIPTION OF THE PREFERRED EMBODIMENTS

The microfibers produced are prepared, in part, using the apparatus discussed, for example, in Wente, Van A., "Superfine Thermoplastic Fibers," *Industrial Engineering Chemistry*, Vol. 48, pp 1342–1346 and in Wente, Van A. et al., "Manufacture of Superfine Organic Fibers," Report No. 4364 of the Naval Research Laboratories, published May 25, 1954, and U.S. Pat. No. 3,849,241 (Butin et al.), U.S. Pat. No. 3,825,379 (Lohkamp et al.), U.S. Pat. No. 4,818,463 (Buehning), U.S. Pat. No. 4,986,743 (Buehning), U.S. Pat. No. 4,295,809 (Mikami et al.) or U.S. Pat. No. 4,375,728 (Wadsworth et al.). These apparatuses and methods are useful in the invention process in the portion shown as die 10 in FIG. 1, which could be of any of these conventional designs.

The microfibers can be formed using a conduit arrangement as disclosed in U.S. Pat. No. 4,729,371 or as discussed in copending patent application "NOVEL MATERIAL AND MATERIAL PROPERTIES FROM MULTI-LAYER BLOWN MICROFIBER WEBS" (E. G. Joseph and D. E. Meyers, inventors)

Ser. No. 07/769,206 filed Sep. 30, 1991 now U.S. Pat. No. 5,207,970, which is being filed concurrently with the present application.

Figure 1:
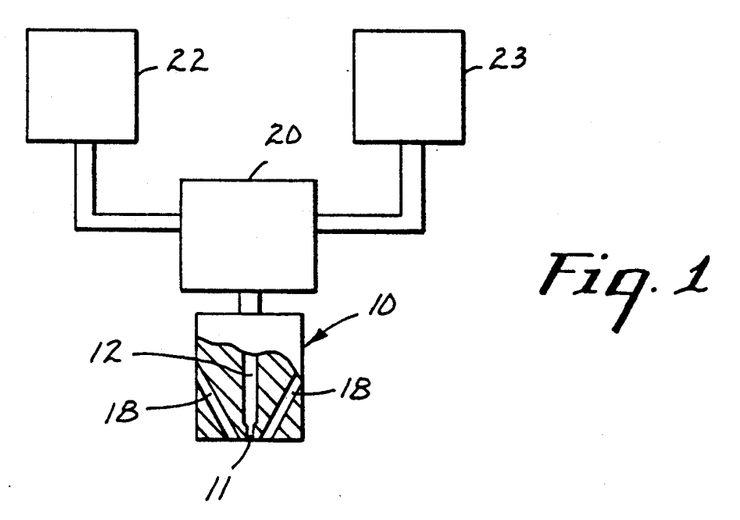
FIG. 1 is a schematic view of an apparatus useful in the practice of the invention method.

The polymeric components are introduced into the die cavity 12 of die 10 from a separate splitter, splitter region or combining manifold 20, and into the, e.g., splitter from extruders, such as 22 and 23. Gear pumps and/or purgeblocks can also be used to finely control the polymer flowrate. In the splitter or combining manifold 20, the separate polymeric component flowstreams are formed into a single layered flowstream such as disclosed in U.S. Pat. No. 3,557,265. However, preferably, the separate flowstreams are kept out of direct contact for as long a period as possible prior to reaching the die 10. The separate polymeric flowstreams from the extruder(s) can be split in the splitter (20). The split or separate flowstreams are combined only immediately prior to reaching the die, or die orifices. This minimizes the possibility of flow instabilities generating in the separate flowstreams after being combined in the single layered flowstream, which tends to result in non-uniform and discontinuous longitudinal layers in the multi-layered microfibers. Flow instabilities can also have adverse effects on non-woven web properties such as strength, temperature stability, or other desirable properties obtainable with the invention process.

From the die cavity 12, the multi-layer polymer flowstream is extruded through an array of side-by-side orifices 11. As discussed above, prior to this extrusion, the feed can be formed into the appropriate profile in the cavity 12, suitably by use of a conventional coat hanger transition piece. Air slots 18, or the like, are disposed on either side of the row of orifices 11 for directing uniform heated air at high velocity at the extruded layered melt streams. The air temperature is generally about that of the meltstream, although preferably 20°-30° C. higher than the polymer melt temperature. This hot, high-velocity air draws out and attenuates the extruded polymeric material, which will generally solidify after traveling a relatively short distance from the die 10. The solidified or partially solidified fibers are then formed into a web by known methods and collected (not shown). The collecting surface can be a solid or perforated surface in the form of a flat surface or a drum, a moving belt, or the like. If a perforated surface is used, the backside of the collecting surface can be exposed to a vacuum or low-pressure region to assist in the deposition of fibers, such as is disclosed in U.S. Pat. No. 4,103,058 (Humlicek). This low-pressure region allows one to form webs with pillowed low-density regions. The collector distance can generally be from 3 to 50 inches from the die face. With closer placement of the collector, the fibers are collected when they have more velocity and are more likely to have residual tackiness from incomplete cooling. This is particularly true for inherently more tacky thermoplastic materials, such as thermoplastic elastomeric materials. Moving the collector closer to the die face, e.g., preferably 3 to 12 inches, will result in stronger inter-fiber bonding and a less lofty web. Moving the collector back will generally tend to yield a loftier and less coherent web.

The temperature of the separate polymer flowstreams can also be controlled to bring the polymers closer to a more suitable relative viscosity. When the separate polymer flowstreams converge, they should generally have an apparent viscosity of from 150 to 800 poise (as measured by a capillary rheometer). The relative viscosities of the separate polymeric flowstreams to be converged should generally be fairly well matched. Empirically, this can be determined by varying the temperature of the melt and observing the crossweb properties of the collected web. The more uniform the crossweb properties, the better the viscosity match. The overall viscosity of the layered combined polymeric flowstream(s) at the die face should be from 150 to 800 poise, preferably from 200 to 400 poise. The differences in relative viscosities are preferably generally the same as when the separate polymeric flowstreams are first combined. The apparent viscosities of the polymeric flowstream(s) can be adjusted at this point by varying the temperatures as per U.S. Pat. No. 3,849,241 (Butin, et al).

The size of the polymeric fibers formed depends to a large extent on the velocity and temperature of the attenuating airstream, the orifice diameter, the temperature of the melt stream, and the overall flow rate per orifice. At high air volume rates, the fibers formed have an average fiber diameter of less than about 10 micrometers, however, there is an increased difficulty in obtaining webs having uniform properties as the air flow rate increases. At more moderate air flow rates, the polymers have larger average diameters, however, with an increasing tendency for the fibers to entwine into formations called "ropes". This is dependent on the polymer flow rates, of course, with polymer flow rates in the range of 0.05 to 0.5 gm/min/orifice generally being suitable. Coarser fibers, e.g., up to 25 micrometers or more, can be used in certain circumstances such as large pore, or coarse, filter webs.

The multi-layer microfibers of the invention can be admixed with other fibers or particulates prior to being collected. For example, sorbent particulate matter or fibers can be incorporated into the coherent web of blown multi-layered fibers as discussed in U.S. Pat. Nos. 3,971,373 or 4,429,001. In these patents, two separate streams of melt-blown fibers are established with the streams intersecting prior to collection of the fibers. The particulates, or fibers, are entrained into an airstream, and this particulate-laden airstream is then directed at the intersection point of the two microfiber streams. Other methods of incorporating particulates or fibers, such as staple fibers, bulking fibers or binding fibers, can be used with the invention melt-blown microfiber webs, such as is disclosed, for example, in U.S. Pat. Nos. 4,118,531, 4,429,001 or 4,755,178, where particles or fibers are delivered into a single stream of melt-blown fibers.

Other materials such as surfactants or binders can be incorporated into the web before, during or after its collection, such as by use of a spray jet. If applied before collection, the material is sprayed on the stream of microfibers, with or without added fibers or particles, traveling to the collection surface.

The microfibers are formed from an elastomeric material forming one layer or layers and a relatively nonelastic material forming the other layer or layers. Typically an elastomer is a material that will substantially resume its shape after being stretched. Such elastomers will preferably exhibit permanent set of about 20 percent or less, preferably 10 percent or less, when stretched at moderate elongations, preferably of about 300–500 percent. Elastomers include materials or blends, which are capable of undergoing elongations preferably of up to 1200% and more at room temperatures.

The relatively nonelastic material is generally a more rigid or higher modulus material capable of being coextruded with the elastomeric low modulus material. Further, the relatively nonelastic material must undergo permanent deformation or cold stretch at the stretch percentage that the elastomeric low modulus material will undergo without significant elastic recovery. The Young's modulus of this material should generally be greater than $10^6 N/M^2$ and preferably greater than $10^7 N/M^2$.

Webs formed from these multi-layer fibers exhibit which is believed due to the extensibility of individual fibers in a coherent web structure under low levels of stress. Webs also exhibit a remarkable extensibility without the usual web breakage. This is believed to be attributable to a unique complimentary combination of properties from the individual layers in the multi-layer fibers and from the interfiber relationships in the web as a whole. The preferably elastomeric layers allows one to lower the individual fiber composite modulus to a level that permits ready extensibility at relatively low stress levels. As such when the web is tensioned the applied stress will dissipate by elongation of individual fibers rather than concentrating at web weak points, which could result in fiber breakage and web failure.

The elastomer will have a tendency to resume its original shape after being elongated. This results in a tendency for the web to contract after being stretched. This corresponds into a significant degree of lofting of the web. This web contraction and resultant lofting has been found to vary significantly depending on the materials used in the elastomer layer and the higher modulus layer, the relative volume percent of the respective layers and the overall number of layers in the microfibers. Generally, the most recovery is exhibited by webs formed of microfibers having a relatively low number of layers and a higher volume percentage of the elastomer layers.

The individual fibers that exhibit recovery also are self-crimping. Fiber coiling and occasional separation of individual outer layers from stressed fibers compliments and aid the relatively high degree of lofting in the resultant web. This lofting and fiber and fiber separation results in improved softness or feel to the web and wipes made therefrom. The resultant wipes exhibit a significant increase in loft and absorption capacity that increases dramatically over wipes formed from corresponding single layer fiber nonwoven webs. Advantageously the web thickness increases by 20 percent or more when the web is stretched and allowed to recover, more preferably about 50 percent or more and advantageously up to 100 percent or more increase in loft. Correspondingly the increase in absorbitive capacity is at least 20 percent, preferably at least 30 percent and advantageously up to 100 percent and more that of a corresponding unstretched web.

The elastomeric material can be any such material suitable for processing by melt blowing techniques. This would include polymers such as polyurethanes; A-B block copolymers where A is formed of poly(vinyl arene) moieties such as polystyrene, and B is an elastomeric mid-block such as a conjugated diene or a lower alkene in the form of a linear di- or tri-block copolymer, a star, radial or branched copolymer, such as elastomers sold as "KRATON TM" (Shell Chemical Co.); polyetheresters (such as "Arnitel TM" available from Akzo Plastics Co.); or polyamides (such as "Pebax TM" available from Autochem Co.). Copolymers and blends can also be used. For example, A-B block copolymer blends as described in U.S. Pat. No. 4,657,802 are suitable where such block copolymers are preferably blended with polyalkylenes. Other possible materials include ethylene copolymers such as ethylene vinyl acetates, ethylene/propylene copolymer elastomers or ethylene/propylene/diene terpolymer elastomers. Blends of all the above materials are also contemplated.

It may be desirable for certain applications to provide greater rigidity and strength. For example, up to 50 weight percent, but preferably less than 30 weight percent, of the polymer blend can be stiffening aids such as polyvinylstyrenes, polystyrenes such as poly(alphamethyl)styrene, polyesters, epoxies, polyolefins, e.g., polyethylene or certain ethylene/vinyl acetates, preferably those of higher molecular weight, or coumarone-indene resin.

Viscosity reducing materials and plasticizers can also be blended with the elastomers and low modulus extensible materials such as low molecular weight polyethylene and polypropylene polymers and copolymers, or tackifying resins such as Wingtack TM aliphatic hydrocarbon tackifiers available from Goodyear Chemical Company. Tackifiers can also be used to increase the adhesiveness of an elastomeric low modulus layer to a relatively nonelastic layer. Examples of tackifiers include aliphatic or aromatic liquid tackifiers, polyterpene resin tackifiers, and hydrogenated tackifying resins. Aliphatic hydrocarbon resins are preferred.

The relatively non-elastomeric layer material is a material capable of elongation and permanent deformation as discussed above, which are fiber forming. Useful materials include polyesters, such as polyethylene terephthalate; polyalkylenes, such as polyethylene or polypropylene; polyamides, such as nylon 6; polystyrenes; or polyarylsulfones. Also useful are certain slightly elastomeric materials such as some olefinic elastomeric materials such as some ethylene/propylene, or ethylene/propylene/diene elastomeric copolymers or other ethylenic copolymers such as some ethylene vinyl acetates.

Conventional additives can be used in any material or polymer blend. Preferably a wetting agent can be employed in one or both of the layers to increase hydrophilic properties. Typical ionic and nonionic surfactants can be used such as allcyl aryl polyester alcohols (Triton TM X-100 and X-102, made by Rohn & Haas, Philadelphia, Pa.), surfactants can be incorporated into the feed polymer, such as described by U.S. Pat. No. 4,578,414 (Sawyer et al), which incorporates mixtures of alkoxylated alkyl phenols, glycericles and/or polyoxlylated fatty acid esters. The surfactants can be mixed into the elastomeric and/or the non-elastomeric materials. Preferably, the surfactants are added to the elastomeric layers.

The web when stretched also displays a noted lofting effect, which is dependant to some degree on the amount of recovery. A further feature of the invention webs is an ability for the webs to undergo further recovery and lofting when heater generally to a temperature greater than about 60° C.

Theoretically, for webs formed from the above described two types of layers either one can advantageously comprise 1 to 99 volume percent of the total fiber volume, however, preferably the elastomeric material will comprise at least about 5 percent of the fiber volume, however, preferably less than 80 percent of the fiber volume. At higher volume percentages the elastomeric component will cause high degrees of contraction of the web after it is stretched. However, too high a percentage of the elastomeric component will result in lower strength and higher density webs at similar collector distances due to increased interfiber bonding.

The web properties can also be altered by variations in the number of layers employed at a given relative volume percent and layer arrangement. Variation in the number of layers, at least at low number of layers, has a tendency to significantly vary the relative proportion of each polymer (assuming two polymeric materials) at the microfiber surface. This (assuming alternating layers of two polymeric materials) translates into variation of those web properties to which the microfiber surface properties significantly contribute such as bondability. For example, web interfiber bonding properties can change depending on which polymer or composition comprises the outside layer(s). However, as the number of layers increases, his variation in web bonding properties based on surface area effects diminishes. At higher-layer numbers, the relative thicknesses of the individual fiber layers will tend to decrease, significantly decreasing the surface area effect of any individual layer. For the preferred melt-blown microfibers with average diameters of thicknesses can get well below 1 micrometer.

Additional effects on the fiber and web properties can be attributed to increases in the number of fiber layers alone. Specifically, it has been found that fiber and web modulus increases with increases in the number of individual layers. However, the elastic recovery behavior of the stretched web goes down significantly. Although not wishing to be bound by theory, it is believed that the decrease in individual layer thicknesses in the microfiber can have a significant effects on the crystalline structure and behavior of the component polymers. By constraining spherulitic growth and constraining transverse polymer flow in the orifice increasing the relative percent of axial flow, tending to increase the degree of order of the polymers in the layered form. These factors can likely influence the macro scale behavior of the component fibers in the web and hence web behavior itself. If a higher number of layers in employed, preferably, the non-elastomeric component is used in decreasing relative volume percentages. In this manner, the web strength advantages can be obtained without significantly effecting the elastic recovery behavior of the web.

Further, with increased microfiber layering, the number of interfaces, and interfacial area, between adjacent layers, increases significantly. This could tend to increase strength due to increased reinforcement and constrainment of the individual layers. It has also been found that it becomes increasingly difficult to separate the fiber inner layers as the total number of layers in the fibers increase. This is true even for relatively incompatible polymers that would ordinarily require compatabilizers or bonding layers to prevent layer separation. However, outer layer can still rather readily separate. This can be used to increase the web fiber surface area and absorbitive capacity. However for the inventions purposes increasing the number of layers beyond 5 is unlikely to result in any significant benefits.

The prestretched invention web thickness generally is from 0.1 to 10 centimeters preferably greater than 1.0 cm, for most applications. Thicknesses below this range will result in low absorbitive capacity webs. Thicknesses significantly above this range will result in increasingly long fluid migration times into the web interior.

For some applications, the multi-layer multifiber web can be a layer in a composite multi-layer structure. The other layers can be supporting webs, films (such as elastic films, semi-permeable films, or impermeable films). Other layers could be used for purposes such as absorbency, surface texture, rigidification and can be non-woven webs formed of, for example, spun bond, staple and/or melt-blown fibers. The other layers can be attached to the invention melt-blown web by conventional techniques such as heat bonding, binders or adhesives or mechanical engagement, such as hydroentanglement or needle punching. Other structures could also be included in a composite structure, such as reinforcing or elastic threads or strands, which would preferably be sandwiched between two layers of the composite structures. These stands or threads can likewise be attached by the conventional methods described above.

Webs, or composite structures including webs of the invention can be further processed after collection or assembly such as by calendaring or point embossing to increase web strength, provide a patterned surface, or fuse fibers at contact points in a web structure or the like; by orientation to provide increased web strength; by needle punching; heat or molding operations; coating, such as with adhesives to provide a tape structure; or the like.

Webs are transformed into their high absorbitive capacity form by stretching the web in one or more directions and releasing the stretched web. The web then recovers a portion of the stretched distance comprising the web in the stretch direction and increasing the web thickness, while resulting in fiber crimping and separation. The web generally should be stretched by 50 percent or more, with higher stretch ratios resulting in loftier and more absorbent webs.

The following examples are provided to illustrate presently contemplated preferred embodiments and the best mode for practicing the invention, but are not intended to be limiting thereof.

TEST PROCEDURES

Tensile Modulus

Tensile modulus data on the multi-layer BMF webs was obtained using an Instron Tensile Tester (Model 1122) with a 10.48 cm (2 in.) jaw gap and a crosshead speed of 25.4 cm/min. (10 in./min.). Web samples were 2.54 cm (1 in.) in width. Elastic recovery behavior of the webs was determined by stretching the sample to a predetermined elongation and measuring the length of the sample after release of the elongation force and allowing the sample to relax for a period of 1 minute.

Wide Angle X-Ray Scattering Test

X-Ray diffraction data were collected using a Philips APD-3600 diffractometer (fitted with a Paur HTK temperature controller and hot stage). Copper $K\alpha$ radiation was employed with power tube settings of 45 kV and 4 mA and with intensity measurements made by means of a Scintillation detector. Scans within the 2-50 degree ($2\theta$) scattering region were performed for each sample at 25 degrees C and a 0.02 degree step increment and 2 second counting time.

Thermal Properties

Melting and crystallization behavior of the polymeric components in the multi-layered BMF webs were studied using a Perkin-Elmer Model DSC-7 Differential Scanning Calorimeter equipped with a System 4 analyzer. Heating scans were carried out at 10° or 20° C. per minute with a holding time of three (3) minutes above the melting temperature followed by cooling at a rate of 10° C. per minute. Areas under the melting endotherm and the crystallization exotherm provided an indication of the amount of crystallinity in the polymeric components of the multi-layered BMF webs.

EXAMPLE 1

A polypropylene/polyurethane multi-layer BMF web of the present invention was prepared using a meltblowing process similar to that described, for example, in Wente, Van A., "Superfine Thermoplastic Fibers," in *Industrial Engineering Chemistry*, Vol. 48, pages 1342 et seq (1956), or in Report No. 4364 of the Naval Research Laboratories, published May 25, 1954, entitled "Manufacture of Superfine Organic Fibers" by Wente, Van A.; Boone, C.D.; and Fluharty, E. L., except that the BMF apparatus utilized two extruders, each of which was equipped with a gear pump to control the polymer melt flow, each pump feeding a five-layer feedblock (splitter) assembly similar to that described in U.S. Pat. No. 3,480,502 (Chisholm et al.) and U.S. Pat. No. 3,487,505 (Schrenk) which was connected to a melt-blowing die having circular smooth surfaced orifices (10/cm) with a 5:1 length to diameter ratio. The first extruder (260° C.) delivered a melt stream of a 800 melt flow rate (MFR) polypropylene (PP) resin (PP-3495G, available from Exxon Chemical Corp.), to the feedblock assembly which was heated to about 260° C. The second extruder, which was maintained at about 220° C., delivered a melt stream of a poly(esterurethane) (PU) resin ("Morthane TM" PS 455-200, available from Morton Thiokol Corp.) to the feedblock. The polymer melt streams were merged in an alternating fashion into a five-layer melt stream on exiting the feedblock, with the outer layers being the PP resin. The gear pumps were adjusted so that a 25:75 pump ratio PP:PU polymer melt was delivered to the feedblock assembly and a 0.14 kg/hr/cm die width (0.8 lb/hr/in.) polymer throughput rate was maintained at the BMF die (260° C.) the feedblock splits the two melt streams. The primary air temperature was maintained at approximately 220° C. and at a pressure suitable to produce a uniform web with a 0.076 cm gap width. Webs were collected at a collector to BMF die distance of 30.5 cm (12 in.). The resulting BMF web, comprising five-layer microfibers having an average diameter of less than about 10 micrometers, had a basis weight of 50 g/m².

EXAMPLE 2

A BMF web having a basis weight of 100 g/m² and comprising 27 layer microfibers having an average diameter of less than about 10 micrometers was prepared according to the procedure of Example 1 except that the PP and PU melt streams were delivered to the 27 layer feed block in a 50:50 ratio.

EXAMPLE 3

Figure 4:
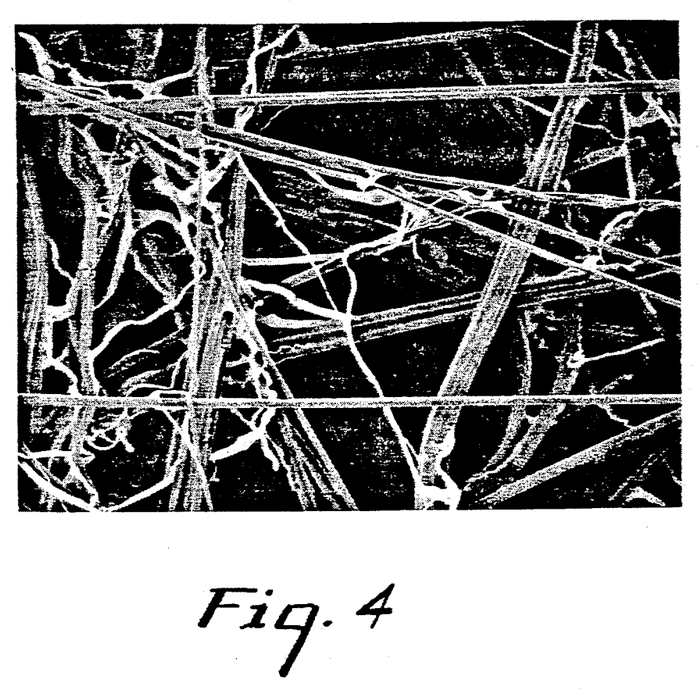
FIG. 4 is a SEM top view of the Example 3 web.

A BMF web having a basis weight of 50 g/m² and comprising five-layer microfibers having an average diameter of less than about 10 micrometers was prepared according to the procedure of Example 1, except that the PP and PU melt streams were delivered to the five-layer feedblock in a 25:75 ratio. The web was stretched in the cross and machine directions (4×4) and the sample was prepared for scanning electron micrograph analysis. FIG. 4 shows a top view of this sample (200×) and the separation of the outer polypropylene layers.

CONTROL WEB I

A control web of the 800 MFR polypropylene (pp) resin was prepared according to the procedure of Example 1, except that only one extruder, which was maintained at 260° C., was used, and it was connected directly to the BMF die through a gear pump. The die and air temperatures were maintained at 260° C. The resulting BMF web had a basis weight of 50 gm/m² and an average fiber diameter of less than about 10 micrometers.

CONTROL WEB II

A control web of the polyurethane resin ("Morthane TM" (PS455-200) was prepared according to the procedure of Example 1, except that only one extruder, which was maintained at about 220° C., was used which was connected directly to the BMF die through a gear pump, and the die and air temperatures were maintained at 220° C. The resulting BMF web had a basis weight of 50 g/m² and an average fiver diameter of less than about 10 micrometers.

Table 1 summarizes the tensile modulus values for BMF webs comprising five-layer microfibers of varying PP/PU polymer ratios.

TABLE 1

Tensile Modulus
Five-Layer PP/PU BMF Webs
50 g/m² Basis Weight

| Example | Pump Ratio PP/PU | Tensile Modulus MD kPa | Tensile Modulus XMD kPa |
|---|---|---|---|
| Control I | 100:0 | 2041 | 2897 |
| 1 | 75:25 | 6821 | 9235 |
| 2 | 50:50 | 8083 | 9490 |
| 3 | 25:75 | 8552 | 12214 |
| Control II | 0:100 | 1055 | 1814 |

EXAMPLE 4

Figure 6:
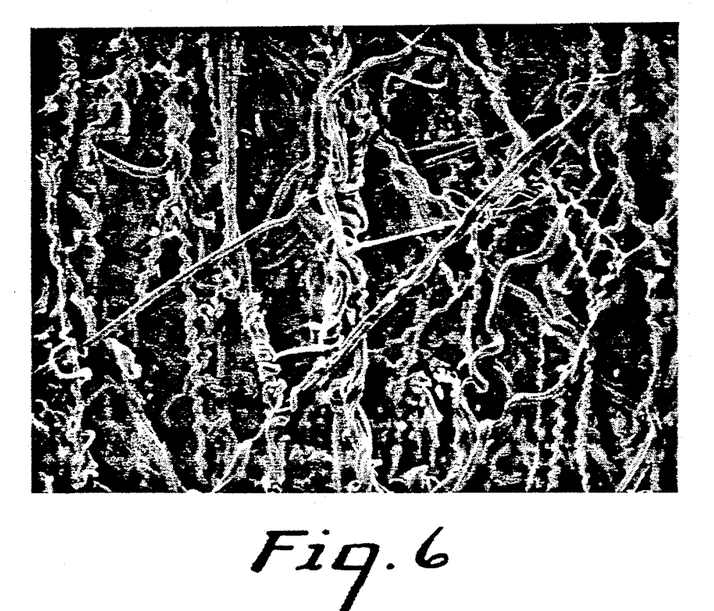
FIG. 6 is a scanning electron micrograph top view of an Example 4 web.

A BMF web having a basis weight of 100 g/m² and comprising two-layer microfibers having an average diameter of less than about 10 micrometers was prepared according to the procedure of Example 3, except that the PP and PU melt streams were delivered to a two-layer feedblock, and the die and air temperatures were maintained at about 230° C. This sample was stretched 200% and released. This sample was then prepared for scanning electron micrograph analysis. FIG. 6 shows a top view of this stretched sample (200×) showing the significant amount of crimp generated by the stretching.

EXAMPLE 5

A BMF web having a basis weight of 100 g/m² and comprising three-layer microfibers having an average diameter of less than about 10 micrometers was prepared according to the procedure of Example 3, except that the PP and PU melt streams were delivered to a three-layer feedblock.

EXAMPLE 6

A BMF web having a basis weight of 100 g/m² and comprising five-layer microfibers having an average diameter of less than about 10 micrometers was prepared according to the procedure of Example 3.

EXAMPLE 7

A BMF web having a basis weight of 100 g/m² and comprising twenty-seven-layer microfibers having an average diameter of less than about 10 micrometers was prepared according to the procedure of Example 3, except that the PP and PU melt streams were delivered to a twenty-seven-layer feedblock.

Table 2 summarizes the modulus values for a series of BMF webs having a 25:75 PP:PU ratio, but varying numbers of layers in the microfibers.

TABLE 2

Web Modulus as a Function of Layers in Microfiber
25:75 PP/PU Pump Ratio
100 g/m² Basis Weight

| Example | Number of Layers | MD Tensile Modulus (kPa) |
| --- | --- | --- |
| 4 | 2 | 10835 |
| 5 | 3 | 11048 |
| 6 | 5 | 15014 |
| 7 | 27 | 17097 |

Figure 2:
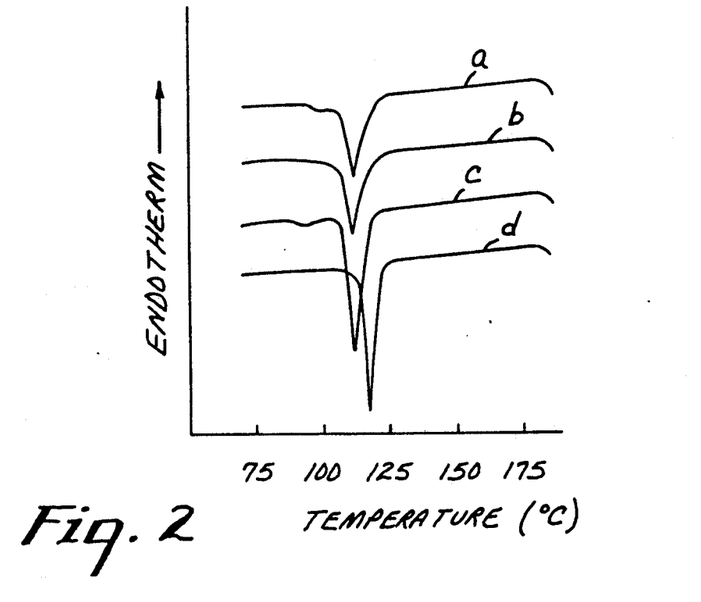
FIGS. 2 is a plot of D.S.C. scans for Examples 4–7 showing increasing exotherms with increasing layering.
Figure 3:
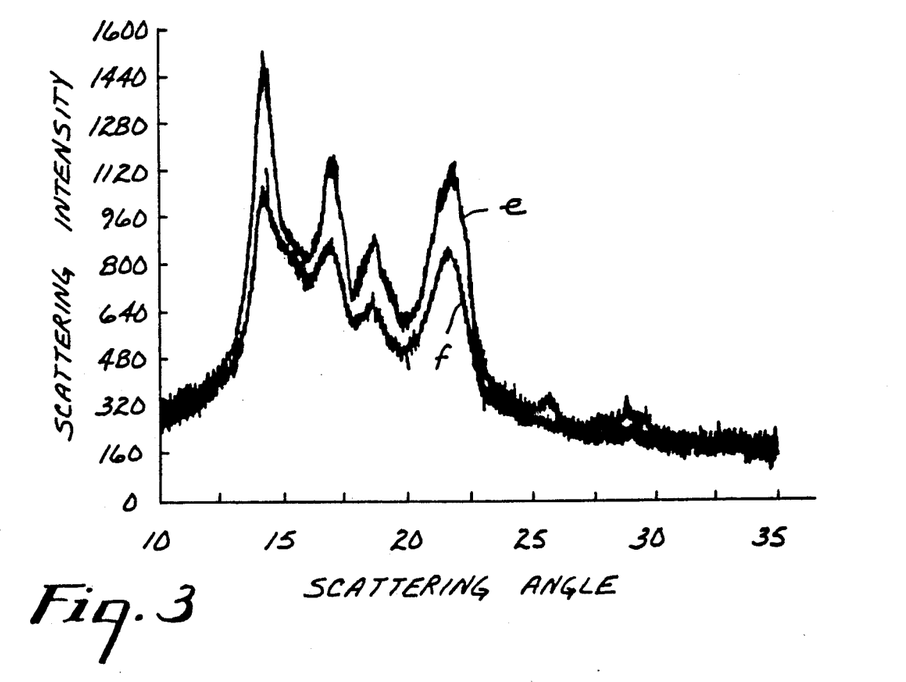
FIG. 3 is a plot of wide-angle x-ray scattering for Examples 5 and 7 showing increasing crystallinity with increasing layering.

The effect that the number of layers within the microfiber cross-section had on the crystallization behavior of the PP/PU BMF webs was studied using differential scanning calorimetry the results of which are graphically presented in FIG. 2. An examination of the crystallization exotherms for the BMF webs of Examples 4, 5, 6 and 7 (a, b, c and d, respectively), which corresponds to blown microfibers having 2, 3, 5 and 27 layers, respectively, indicates that the peak of the crystallization exotherm for the web of Example 7 is approximately 6° C. higher than the corresponding peak values for webs comprising blown microfibers having fewer layers. This data suggests that the crystallization process is enhanced in the microfibers having 27 layers, which is further supported by the examination of the wide angle X-ray scattering data that is illustrated in FIG. 3 and confirms higher crystallinity in the PP of the 27 layer microfiber web samples (e corresponds to Example 7 and f corresponds to Example 5 after the PU was washed out with tetrahydrofuran solvent).

EXAMPLE 8

A BMF web having a basis weight of 100 g/m² and comprising two-layer microfibers having an average diameter of less than about 10 micrometers was prepared according to the procedure of Example 1, except that a 105 MI low-density polyethylene (LLDPE, Aspun TM 6806 available from Dow Chemical) was substituted for the polypropylene and a poly(esterurethane) (PU) resin ("Morthane TM " PS 440-200, available from Morton Thiokol Corp.) was substituted for the Morthane TM PS 455-200, the extruder temperatures were maintained at 230° C. and 230° C., respectively, the melt streams were delivered to a two-layer feedblock maintained at 230° C. at a 75:25 ratio, the BMF die and primary air supply temperatures were maintained at 225° C. and 215° C., respectively, and the collector distance was 30.5 cm.

EXAMPLE 9

A BMF web having a basis weight of 100 g/m² and comprising two-layer microfibers having an average diameter of less than about 10 micrometers was prepared according to the procedure of Example 8, except that the PE and PU melt streams were delivered to the two-layer feedblock in a 50:50 ratio.

EXAMPLE 10

A BMF web having a basis weight of 100 g/m² and comprising two-layer microfibers having an average diameter of less than about 10 micrometers was prepared according to the procedure of Example 8, except that the PE and PU melt streams were delivered to the two-layer feedblock in a 25:75 ratio.

CONTROL WEB III

A control web of the LLDPE resin (Aspun TM 6806) was prepared according to the procedure of Example 1, except that only one extruder, which was maintained at 210° C., was used, and it was connected directly to the BMF die through a gear pump, and the die and air temperatures were maintained at 210° C., and the collector distance was 25.4 cm. The resulting BMF web had a basis weight of 100 g/m² and an average fiber diameter of less than about 10 micrometers.

CONTROL WEB IV

A control web of the polyurethane resin (Morthane TM PS440-200) was prepared according to the procedure of Example 1, except that only one extruder, which was maintained at 230° C., was used which was connected directly to the BMF die through a gear pump, and the die and air temperatures were maintained at 230° C. The resulting BMF web had a basis weight of 100 g/m² and an average fiber diameter of less than about 10 micrometers.

Table 3 summarizes the tensile modulus values for BMF webs comprising two-layer microfibers of varying PE/PU compositions.

TABLE 3

Tensile Modulus
Two-Layer PE/PU BMF Webs
100 g/m² Basis Weight

| Example | Pump Ratio PE/PU | MD Tensile Modulus (kPa) |
| --- | --- | --- |
| Control III | 100:0 | 1172 |
| 8 | 75:25 | 4923 |
| 9 | 50:50 | 3737 |
| 10 | 25:75 | 2654 |
| Control IV | 0:100 | 2130 |

Figure 7:
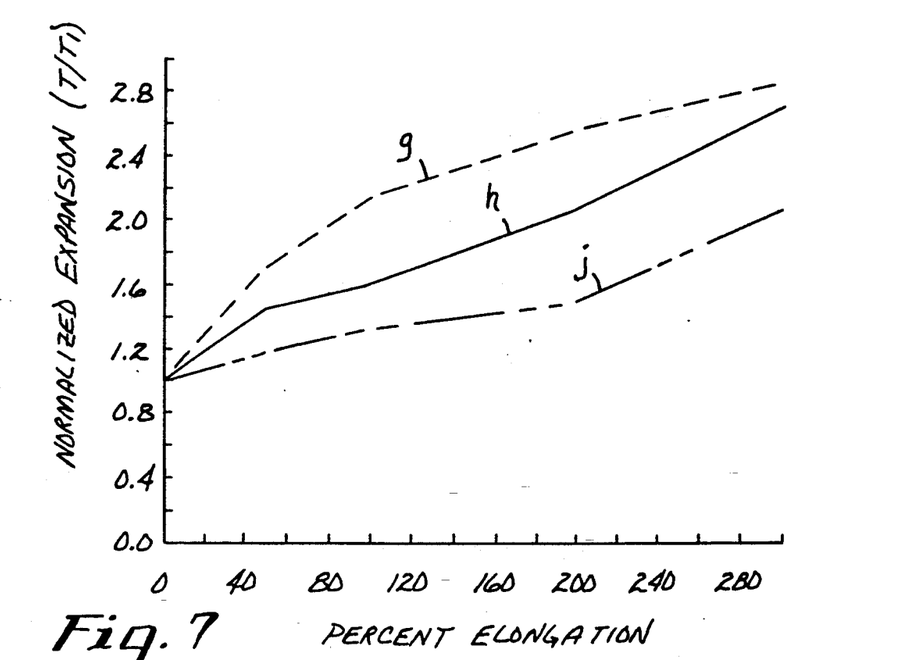
FIG. 7 is a plot of the normalized web expansion versus elongation for the webs of Examples 8–10.

FIG. 7 is a plot of the normalized expansion of the web (verticle axis) as a function of the percent elongation of the webs from Examples 8, 9 and 10 (j, h and g respectively). The normalized expansion is the ratio of the web thickness after elongation and release versus the original web thickness as formed.

EXAMPLE 11

BMF web having a basis weight of 50 g/m² and comprising five-layer microfibers having an average diameter of less than about 10 micrometers was prepared according to the procedure of Example 1, except that a poly(ethylene terephthalate) resin (PET having an I.V.=0.60, and a melting point of about 257° C., prepared as described in U.S. Pat. No. 4,939,008, col. 2, line 6 to col. 3, line 20) was substituted for the polypropylene and a poly(esterurethane) (PU) resin (Morthane ™ PS 440-200, available from Morton Thiokol Corp.) was substituted for the Morthane ™ PS 455-200 (in a 75:25 ratio), the melt streams were delivered to the five-layer feedblock at about 280° C. and about 230° C., respectively, and the feedblock, die and air temperatures were maintained at 280° C., 280° C. and 270° C., respectively.

EXAMPLE 12

A BMF web having a basis weight of 50 g/m$^2$ and comprising five-layer microfibers having an average diameter of less than about 10 micrometers was prepared according to the procedure of Example 11, except that the PET and PU melt streams were delivered to the five-layer feedblock in a 50:50 ratio.

EXAMPLE 13

A BMF web having a basis weight of 50 g/m$^2$ and comprising five-layer microfibers having an average diameter of less than about 10 micrometers was prepared according to the procedure of Example 11, except that the PET and PU melt streams were delivered to the five-layer feedblock in a 25:75 ratio.

CONTROL WEB V

A control web of the poly(ethylene terephthalate) (I.V.=0.60) resin was prepared according to the procedure of Example 1, except that only one extruder, which was maintained at about 300° C., was used which was connected directly to the BMF die through a gear pump, and the die and air temperatures were maintained at 300° C. and 305° C., respectively. The resulting BMF web had a basis weight of 100 g/m$^2$ and an average fiber diameter of less than about 10 micrometers.

Table 4 summarizes the tensile modulus values for BMF webs comprising five-layer microfibers of varying PET/PU compositions.

TABLE 4

Tensile Modulus
Five-Layer PET/PU BMF Webs
50 g/m$^2$ Basis Weight

| Example | Pump Ratio PET/PU | MD Tensile Modulus (kPa) |
|---|---|---|
| Control V | 100:0 | 772[1] |
| 11 | 75:25 | 9674 |
| 12 | 50:50 | 10770 |
| 13 | 25:75 | 12376 |
| Control IV | 0:100 | 1834 |

[1] 100 g/m$^2$ basis weight.

EXAMPLE 14

A BMF web having a basis weight of 50 g/m$^2$ and comprising five-layer microfibers having an average diameter of less than about 10 micrometers was prepared according to the procedure of Example 1, except that a 60/40 blend of Kraton ™ G-1657, a hydrogenated styrene/ethylene-butylene/styrene A-B-A block copolymer (SEBS) available from Shell Chemical Corp., and a linear low-density polyethylene (LLDPE) Aspun ™ 6806, 105 MI, available from Dow Chemical, was substituted for the Morthane ™ PS 455-200 the extruder temperatures were maintained at 250° C. and 270° C., respectively, the melt streams were delivered to a five-layer feedblock maintained at 270° C. at a 75:25 ratio, and the die and primary air temperatures were maintained at 270° C. and 255° C., respectively.

EXAMPLE 15

A BMF web having a basis weight of 50 g/m$^2$ and comprising five-layer microfibers having an average diameter of less than about 10 micrometers was prepared according to the procedure of Example 14, except that the PP and SEBS/LLDPE blend melt streams were delivered to the five-layer feedblock in a 50:50 ratio.

EXAMPLE 16

A BMF web having a basis weight of 50 g/m$^2$ and comprising five-layer microfibers having an average diameter of less than about 10 micrometers was prepared according to the procedure of Example 14, except that the PP and SEBS/LLDPE blend melt streams were delivered to the five-layer feedblock in a 25:75 ratio.

CONTROL WEB VI

A control web of the 60/40 SEBS/LLDPE blend was prepared according to the procedure of Example 1, except that only one extruder, which was maintained at 270° C., was used which was connected directly to the BMF die through a gear pump, and the die and air temperatures were maintained at 270° C. The resulting BMF web had a basis weight of 50 g/m$^2$ and an average fiber diameter of less than about 10 micrometers.

Table 5 summarizes the tensile modulus values for BMF webs comprising five-layer microfibers of varying PP//SEBS/LLDPE compositions.

TABLE 5

Tensile Modulus
Five-Layer PP//SEBS/LLDPE BMF Webs
50 g/m$^2$ Basis Weight

| Example | Pump Ratio PP/Blend | MD Tensile Modulus (kPa) |
|---|---|---|
| Control 1 | 100:0 | 2034 |
| 14 | 75:25 | 18685 |
| 15 | 50:50 | 12011 |
| 16 | 25:75 | 6978 |
| Control VI | 0:100 | 434 |

EXAMPLE 17

A BMF web having a basis weight of 50 g/m$^2$ and comprising two-layer microfibers having an average diameter of less than about 10 micrometers was prepared according to the procedure of Example 14, except that a two-layer feedblock assembly was substituted for the five-layer feedblock.

EXAMPLE 18

A BMF web having a basis weight of 50 g/m$^2$ and comprising two-layer microfibers having an average diameter of less than about 10 micrometers was prepared according to the procedure of Example 17, except that the PP and SEBS/LLDPE blend melt streams were delivered to the two-layer feedblock in a 50:50 ratio.

EXAMPLE 19

A BMF web having a basis weight of 50 g/m$^2$ and comprising two-layer microfibers having an average diameter of less than about 10 micrometers was prepared according to the procedure of Example 17, except that the PP and SEBS/LLDPE blend melt streams were delivered to the two-layer feedblock in a 25:75 ratio.

Table 6 summarizes the tensile modulus values for BMF webs comprising two-layer microfibers of varying PP//SEBS/LLDPE compositions.

TABLE 6

Tensile Modulus
Two-Layer PP//SEBS/LLDPE BMF Webs
50 g/m² Basis Weight

| Example | Pump Ratio PP/Blend | MD Tensile Modulus kPa |
|---|---|---|
| Control I | 100:0 | 2034 |
| 17 | 75:25 | 10197 |
| 18 | 50:50 | 7357 |
| 19 | 25:75 | 3103 |
| Control VI | 0:100 | 434 |

EXAMPLE 20

A BMF web having a basis weight of 100 g/m² and comprising two-layer microfibers having an average diameter of less than about 10 micrometers was prepared according to the procedure of Example 8, except that the collector distance was 15.2 cm (6in.).

EXAMPLE 21

A BMF web having a basis weight of 100 g/m² and comprising two-layer microfibers having an average diameter of less than about 10 micrometers was prepared according to the procedure of Example 9, except that the collector distance was 15.2 cm (6in.).

EXAMPLE 22

A BMF web having a basis weight of 100 g/m² and comprising two-layer microfibers having an average diameter of less than about 10 micrometers was prepared according to the procedure of Example 10, except that the collector distance was 15.2 cm (6in.).

Table 7 summarizes the MD modulus values for a number of two-layer PE/PU web compositions which were prepared utilizing two collector distances.

TABLE 7

Web Modulus as a Function of Collector Distance
for Various Two-Layer PE/PU Compositions
100 g/m² Basis Weight

| Example | Composition (Parts PE/PU) | Collector Distance (cm) | MD Tensile Modulus (kPa) |
|---|---|---|---|
| 8 | 75:25 | 30.5 | 4923 |
| 20 | 75:25 | 15.2 | 12590 |
| 9 | 50:50 | 30.5 | 3737 |
| 21 | 50:50 | 15.2 | 9494 |
| 10 | 25:75 | 30.5 | 2654 |
| 22 | 75:25 | 15.2 | 7929 |

The recovery behavior of BMF webs comprising multi-layered BMF fibers was studied by subjecting samples of BMF webs consisting of various multi-layered fiber compositions to elongations of 100, 200 and 400% and monitoring the length of the samples after the elongation force had been removed and the samples allowed to relax for a period of one minute. Elastic recovery was calculated using the formula:

$$\% \text{ Elastic Recovery} = \frac{L_{Stretched} - L_{Recovered}}{L_{Stretched} - L_{Initial}} \times 100$$

Results of this study are summarized in Tables 8–13.

EXAMPLE 23

A BMF web having a basis weight of 100 g/m² and comprising three-layer microfibers having an average diameter of less than about 10 micrometers was prepared according to the procedure of Example 22, except that the PE and PU polymer melt streams were delivered to a three-layer feedblock in a manner such that the outer layer of the fiber was PU (I/O configuration).

EXAMPLE 24

A BMF web having a basis weight of 100 g/m² and comprising three-layer microfibers having an average diameter of less than about 10 micrometers was prepared according to the procedure of Example 21, except that the PE and PU polymer melt streams were delivered to a three-layer feedblock in a manner such that the outer layer of the fiber was PU (I/O configuration).

EXAMPLE 25

A BMF web having a basis weight of 50 g/m² and comprising three-layer microfibers having an average diameter of less than about 10 micrometers was prepared according to the procedure of Example 3, except that the PP and PU melt streams were delivered to a three-layer feedblock.

EXAMPLE 26

A BMF web having a basis weight of 50 g/m² and comprising three-layer microfibers having an average diameter of less than about 10 micrometers was prepared according to the procedure of Example 2 except, that the PP and PU melt streams were delivered to a three-layer feedblock.

EXAMPLE 27

A BMF web having a basis weight of 75 g/m² and comprising three-layer microfibers having an average diameter of less than about 10 micrometers was prepared according to the procedure of Example 3.

EXAMPLE 28

A BMF web having a basis weight of 155 g/m² and comprising three-layer microfibers having an average diameter of less than about 10 micrometers was prepared according to the procedure of Example 3.

EXAMPLE 29

A BMF web having a basis weight of 100 g/m² and comprising three-layer microfibers having an average diameter of less than about 10 micrometers was prepared according to the procedure of Example 3, except that Pellathane TM 2103-80WC, a polyether urethane available from Dow Chemical Corp. was substituted for the Morthane TM PS 455-200, the extruders delivering the PP and PU melts were maintained at 240° C. and 210° C., respectively, the PP and PU melt streams were delivered to a three-layer feedblock, which was maintained at 240° C., and the die and air temperatures were maintained at 230° C. and 215° C., respectively.

EXAMPLE 30

A BMF web having a basis weight of 190 g/m² and comprising three-layer microfibers having an average diameter of less than about 10 micrometers was prepared according to the procedure of Example 29.

EXAMPLE 31

A BMF web having a basis weight of 100 g/m² and comprising five-layer microfibers having an average diameter of less than about 10 micrometers was prepared according to the procedure of Example 3, except that Pellathane ™ 2103-80WC, a polyether urethane available from Dow Chemical Corp. was substituted for the Morthane ™ PS 455-200, the extruders delivering the PP and PU melts were maintained at 240° C. and 210° C., respectively, the PP and PU melt streams were delivered to a five-layer feedblock, which was maintained at 240° C., and the die and air temperatures were maintained at 230° C. and 220° C., respectively.

CONTROL WEB VII

A control web of the polyether urethane resin (Pellathane ™ 2103-80WC) was prepared according to the procedure of Example 1, except that only one extruder, which was maintained at 210° C., was used which was connected directly to the BMF die through a gear pump and the die and air temperatures were maintained at 210° C. The resulting BMF web had a basis weight of 100 g/m² and an average fiber diameter of less than about 10 micrometers.

EXAMPLE 32

A BMF web having a basis weight of 100 g/m² and comprising five-layer microfibers having an average diameter of less than about 10 micrometers was prepared according to the procedure of Example 1, except that SEBS ™ G-1657, a hydrogenated styrene/ethylene-butadiene/styrene A-B-A block copolymer available from Shell Chemical Corp. was substituted for the Morthane ™ PS 455-200, both extruder temperatures were maintained at 260° C., the melt streams were delivered to a five-layer feedblock maintained at 240° C. at a 62.5:37.5 ratio, and the die and primary air temperatures maintained at 240° C. and 275° C., respectively.

EXAMPLE 33

A BMF web having a basis weight of 100 g/m² and comprising five-layer microfibers having an average diameter of less than about 10 micrometers was prepared according to the procedure of Example 32, except that PP and SEBS ™ G-1657 melt streams were delivered to the feedblock in a 25:75 ratio.

EXAMPLE 34

A BMF web having a basis weight of 100 g/m² and comprising two layer microfibers having an average diameter of less than about 10 micrometers was prepared according to the procedure of Example 1 except that a poly(esterurethane) (PU) resin (Morthane PS 440-200, available from Morton Thiokol Corp.) was substituted for the Morthane PS 455-200, the second extruder was maintained at 230° C., and the PP and PU melt streams were delivered to the two layer feed block in a 50:50 ratio.

EXAMPLE 35

A BMF web having a basis weight of 100 g/m² and comprising two layer microfibers having an average diameter of less than about 10 micrometers was prepared according to the procedure of Example 1 except that a poly(esterurethane) (PU) resin (Morthane PS 440-200, available from Morton Thiokol Corp.) was substituted for the Morthane PS 455-200, the second extruder was maintained at 230° C., and the PP and PU melt streams were delivered to the two layer feed block in a 25:75 ratio.

TABLE 8

Recovery Behavior
Multi-Layered 25:75 PP/PU BMF Webs
100 g/m² Basis Weight

| Example | # of Layers | Initial Length (mm) | Post Elongation Length (mm) | Recovered Length (mm) |
|---------|-------------|---------------------|------------------------------|------------------------|
| 4 | 2 | 25.4 | 51 | 33.5 |
| 4 | 2 | 25.4 | 76 | 38.8 |
| 4 | 2 | 25.4 | 127 | 48.6 |
| 5 | 3 | 25.4 | 51 | 37.3 |
| 5 | 3 | 25.4 | 76 | 52.5 |
| 5 | 3 | 25.4 | 127 | 86.5 |
| 6 | 5 | 25.4 | 51 | 39.6 |
| 6 | 5 | 25.4 | 76 | 56.8 |
| 6 | 5 | 25.4 | 127 | 95.1 |

TABLE 9

Elastic Recovery
Multi-Layered 25:75 PP/PU BMF Webs
100 g/m² Basis Weight

| Example | # of Layers | % Recovery After Elongation of 100% | 200% | 400% |
|---------|-------------|-----|------|------|
| 4 | 2 | 68 | 74 | 77 |
| 5 | 3 | 54 | 46 | 40 |
| 6 | 5 | 45 | 38 | 31 |

TABLE 10

Recovery Behavior
Multi-Layered PE/PU BMF Webs
100 g/m² Basis Weight

| Example | # of Layers | Initial Length (mm) | Post Elongation Length (mm) | Recovered Length (mm) |
|---------|-------------|---------------------|------------------------------|------------------------|
| 22 | (25:75) 2 | 25.4 | 51 | 29.5 |
|  |  | 25.4 | 76 | 34 |
|  |  | 25.4 | 127 | 45 |
| 21 | (50:50) 2 | 25.4 | 51 | 32.3 |
|  |  | 25.4 | 76 | 39.3 |
|  |  | 25.4 | 127 | 47.6 |
| 23 | (25:75) 3 | 25.4 | 51 | 31 |
|  |  | 25.4 | 76 | 39.1 |
|  |  | 25.4 | 127 | 63.3 |
| 24 | (50:50) 3 | 25.4 | 51 | 33 |
|  |  | 25.4 | 76 | 45.3 |
|  |  | 25.4 | 127 | 68.5 |

TABLE 11

Elastic Recovery
Multi-Layered PE/PU BMF Webs
100 g/m² Basis Weight

| Example | # of Layers | % Recovery After Elongation of 100% | 200% | 400% |
|---------|-------------|-----|------|------|
| 22 | 2 | 84 | 83 | 81 |
| 21 | 2 | 73 | 73 | 78 |
| 23 | 3 | 78 | 73 | 63 |
| 24 | 3 | 70 | 61 | 58 |

TABLE 12

Recovery Behavior
PP vs. PE Outer Layer In Two-Layer BMF
100 g/m² Basis Weight

| Example | Poly/ Ratio of Layers | Initial Length (mm) | Post Elongation Length (mm) | Recovered Length (mm) |
|---|---|---|---|---|
| 35 | (PP/PU) 25:75 | 25.4 / 25.4 | 51 / 76 | 30.9 / 34.8 |
| 34 | (PP/PU) 50:50 | 25.4 / 25.4 | 51 / 76 | 32.3 / 37.6 |
| 22 | (PE/PU) 25:75 | 25.4 / 25.4 | 51 / 76 | 29.0 / 33.1 |
| 21 | (PE/PU) 50:50 | 25.4 / 25.4 | 51 / 76 | 30.8 / 36.5 |

TABLE 13

Elastic Recovery
PP vs PE Outer Layer In Two-Layer BMF
100 g/m² Basis Weight

| Example | Comp of Layers | % Recovery After Elongation of 100% | 200% | 400% |
|---|---|---|---|---|
| 35 | PP/PU | 79 | 81 | —* |
| 34 | PP/PU | 73 | 76 | —* |
| 22 | PE/PU | 86 | 85 | —* |
| 21 | PE/PU | 79 | 78 | —* |

*—sample broke on attempting to stretch to 400% elongation.

In addition to monitoring the web recovery under ambient conditions, samples of several webs were subjected to post elongation annealing at elevated temperatures to determine if further recovery would be realized at elevated temperatures. Unless indicated otherwise, the web samples were placed in a circulating air oven at the indicated temperature for a period of 0.5 minutes, and the samples measured to determine if further recovery had occurred. Results of these studies are summarized in Tables 14–16.

TABLE 14

Elastic Recovery Properties of Polypropylene/Polyurethane (455-200) Elongated/Annealed Webs

| Example | Comp. Polymer/ Ratio | # Layers | Basis Wt. (g/m₂) | Init. Length (mm) | Elong. Length (mm) | Rc'vd. Length (mm) | Sample Orient. | Ann. Temp. (°C.) | Pre Ann. Length (mm) | Post Ann. Length (mm) |
|---|---|---|---|---|---|---|---|---|---|---|
| 25 | PP/PU 25/75 | 3 | 50 | 26.9 | 79.7 | 49.3 | XMD | 90 | 43.1[1] | 33.2 |
| 26 | PP/PU 50/50 | 3 | 50 | 26.9 | 79.7 | 53.3 | XMD | 90 | 48.1[1] | 35.2 |
| 3 | PP/PU 25/75 | 5 | 50 | 26.9 | 79.7 | 57.7 | XMD | 90 | 53.4[1] | 43.2 |
| 2 | PP/PU 50/50 | 5 | 50 | 26.9 | 79.7 | 61.2 | XMD | 90 | 56.2[1] | 50.2 |
| 25 | PP/PU 25/75 | 3 | 50 | 26.6 | 53.0 | 36.0 | XMD | 125 | 34.5[1] | 31.1 |
| 26 | PP/PU 25/75 | 3 | 50 | 26.7 | 79.7 | 49.3 | XMD | 125 | 45.2[1] | 33.8 |
| 26 | PP/PU 50/50 | 3 | 50 | 26.6 | 53.0 | 39.1 | XMD | 125 | 36.1[1] | 32.1 |
| 26 | PP/PU 50/50 | 3 | 50 | 26.7 | 79.7 | 53.8 | XMD | 125 | 47.3[1] | 35.2 |
| 3 | PP/PU 25/75 | 5 | 50 | 26.6 | 53.0 | 39.0 | XMD | 125 | 37.0[1] | 33.0 |
| 3 | PP/PU 25/75 | 5 | 50 | 26.7 | 79.7 | 57.9 | XMD | 125 | 53.9[1] | 42.7 |
| 2 | PP/PU 50/50 | 5 | 50 | 26.6 | 53.0 | 42.0 | XMD | 125 | 39.0[1] | 36.0 |
| 2 | PP/PU 50/50 | 5 | 50 | 26.7 | 79.7 | 63.3 | XMD | 125 | 53.2[1] | 49.2 |
| Cntl II | PU | — | 50 | 25.4 | 125 | 30.5 | MD | 90 | 30.5 | 26.8 |
| Cntl I | PP | — | 50 | 25.4[2] | — | — | MD | — | — | — |
| 25 | PP/PU 25/75 | 3 | 50 | 26.5 | 79.8 | 51.2 | MD | 90 | 51.2 | 33.5 |
| 25 | PP/PU 25/75 | 3 | 50 | 27.0 | 133.0 | 64.2 | MD | 90 | 64.2 | 36.8 |
| 26 | PP/PU 50/50 | 3 | 50 | 26.5 | 79.8 | 54.1 | MD | 90 | 54.1 | 34.4 |
| 26 | PP/PU 50/50 | 3 | 50 | 27.0 | 133.0 | 77.1 | MD | 90 | 77.1 | 52.3 |
| 3 | PP/PU 25/75 | 5 | 50 | 26.5 | 79.8 | 57.0 | MD | 90 | 57.0 | 42.2 |
| 3 | PP/PU 25/75 | 5 | 50 | 27.0 | 133.0 | 88.4 | MD | 90 | 88.4 | 56.3 |
| 2 | PP/PU 50/50 | 5 | 50 | 26.5 | 79.8 | 63.4 | MD | 90 | 63.4 | 50.3 |
| 2 | PP/PU 50/50 | 5 | 50 | 27.0 | 133.0 | 100.0 | MD | 90 | 100.0 | 77.2 |
| 27 | PP/PU 25/75 | 5 | 75 | 26.5 | 79.8 | 50.3 | MD | 90 | 50.3 | 36.8 |
| 27 | PP/PU 25/75 | 5 | 75 | 27.0 | 133.0 | 87.5 | MD | 90 | 87.5 | 52.5 |
| 6 | PP/PU 25/75 | 5 | 100 | 26.5 | 79.8 | 53.4 | MD | 90 | 53.4 | 39.4 |

TABLE 14-continued

Elastic Recovery Properties of
Polypropylene/Polyurethane (455-200)
Elongated/Annealed Webs

| Example | Comp. Polymer/ Ratio | # Layers | Basis Wt. (g/m$_2$) | Init. Length (mm) | Elong. Length (mm) | Rc'vd. Length (mm) | Sample Orient. | Ann. Temp. (°C.) | Pre Ann. Length (mm) | Post Ann. Length (mm) |
|---|---|---|---|---|---|---|---|---|---|---|
| 6 | PP/PU 25/75 | 5 | 100 | 27.0 | 133.0 | 80.0 | MD | 90 | 80.0 | 47.7 |
| 27 | PP/PU 25/75 | 5 | 155 | 26.5 | 79.8 | 54.3 | MD | 90 | 54.3 | 39.4 |
| 27 | PP/PU 25/75 | 5 | 155 | 27.0 | 133.0 | 80.0 | MD | 90 | 80.0 | 47.7 |

[1] A delay of 24 hrs. between measuring the initial recovery length and the annealing experiment allowed further relaxation of the BMF web and additional recovery to occur.
[2] Polypropylene BMF was inelastic and broke on attempted elongation.

TABLE 15

Elastic Recovery Properties of
Polypropylene/Polyurethane (Pellathane 2103-80WC)
Elongated/Annealed Webs

| Example | Comp. Polymer/ Ratio | # Layers | Basis Wt. (g/m$_2$) | Init. Length (mm) | Elong. Length (mm) | Rc'vd. Length (mm) | Sample Orient. | Ann. Temp. (°C.) | Pre Ann. Length (mm) | Post Ann. Length (mm) |
|---|---|---|---|---|---|---|---|---|---|---|
| 29 | PP/PU 25/75 | 3 | 100 | 26.9 | 79.7 | 42.7 | XMD | 90 | 39.2[1] | 37.1 |
| 30 | PP/PU 25/75 | 3 | 190 | 26.9 | 79.7 | 44.8 | XMD | 90 | 39.7[1] | 37.1 |
| 29 | PP/PU 25/75 | 3 | 100 | 26.6 | 53.0 | 34.1 | XMD | 125 | 31.1[1] | 30.1 |
| 29 | PP/PU 25/75 | 3 | 100 | 26.7 | 79.7 | 41.2 | XMD | 125 | 32.8[1] | 32.3 |
| 30 | PP/PU 25/75 | 3 | 190 | 26.6 | 53.0 | 34.1 | XMD | 125 | 31.2[1] | 30.1 |
| 30 | PP/PU 25/75 | 3 | 190 | 26.7 | 79.7 | 42.3 | XMD | 125 | 33.1[1] | 33.1 |
| Cntl VII | PU | — | 100 | 25.4 | 125 | 34.6 | MD | 90 | 34.6 | 28.4 |
| Cntl I | PP | — | 100 | 25.4 | — | — | MD | — | — | — |
| 30 | PP/PU 25/75 | 3 | 100 | 26.5 | 79.8 | 37.9 | MD | 90 | 37.9 | 31.7 |
| 30 | PP/PU 25/75 | 3 | 100 | 27.0 | 133.0 | 46.5 | MD | 90 | 46.5 | 33.7 |
| 31 | PP/PU 25/75 | 5 | 100 | 26.5 | 79.8 | 46.2 | MD | 90 | 46.2 | 37.3 |
| 31 | PP/PU 25/75 | 5 | 100 | 27.0 | 133.0 | 67.1 | MD | 90 | 67.1 | 42.3 |

[1] A delay of 24 hrs. between measuring the initial recovery length and the annealing experiment allowed further relaxation of the BMF web and additional recovery to occur.
[2] Polypropylene BMF was inelastic and broke on attempted elongation.

TABLE 16

Elastic Recovery Properties of
Polypropylene/Polyurethane (455-200)
Elongated/Annealed Webs

| Example | Comp. Polymer/ Ratio | # Layers | Basis Wt. (g/m$_2$) | Init. Length (mm) | Elong. Length (mm) | Rc'vd. Length (mm) | Sample Orient. | Ann. Temp. (°C.) | Pre Ann. Length (mm) | Post Ann. Length (mm) |
|---|---|---|---|---|---|---|---|---|---|---|
| 32 | PP/PU 25/75 | 3 | 50 | 26.9 | 79.7 | 49.3 | XMD | 90 | 43.1[1] | 33.2 |
| 33 | PP/PU 50/50 | 3 | 50 | 26.9 | 79.7 | 53.3 | XMD | 90 | 48.1[1] | 35.2 |
| 3 | PP/PU 25/75 | 5 | 50 | 26.9 | 79.7 | 57.7 | XMD | 90 | 53.4[1] | 43.2 |
| 2 | PP/PU 50/50 | 5 | 50 | 26.9 | 79.7 | 61.2 | XMD | 90 | 56.2[1] | 50.2 |
| 32 | PP/PU 25/75 | 3 | 50 | 26.6 | 53.0 | 36.0 | XMD | 125 | 34.5[1] | 31.1 |
| 33 | PP/PU 25/75 | 3 | 50 | 26.7 | 79.7 | 49.3 | XMD | 125 | 45.2[1] | 33.8 |
| 33 | PP/PU 50/50 | 3 | 50 | 26.6 | 53.0 | 39.1 | XMD | 125 | 36.1[1] | 32.1 |
| 33 | PP/PU 50/50 | 3 | 50 | 26.7 | 79.7 | 53.8 | XMD | 125 | 47.3[1] | 35.2 |
| 3 | PP/PU 25/75 | 5 | 50 | 26.6 | 53.0 | 39.0 | XMD | 125 | 37.0[1] | 33.0 |
| 3 | PP/PU 25/75 | 5 | 50 | 26.7 | 79.7 | 57.9 | XMD | 125 | 53.9[1] | 42.7 |
| 2 | PP/PU | 5 | 50 | 26.6 | 53.0 | 42.0 | XMD | 125 | 39.0[1] | 36.0 |

TABLE 16-continued

Elastic Recovery Properties of
Polypropylene/Polyurethane (455-200)
Elongated/Annealed Webs

| Example | Comp. Polymer/ Ratio | # Layers | Basis Wt. (g/m₂) | Init. Length (mm) | Elong. Length (mm) | Rc'vd. Length (mm) | Sample Orient. | Ann. Temp. (°C.) | Pre Ann. Length (mm) | Post Ann. Length (mm) |
|---|---|---|---|---|---|---|---|---|---|---|
| 2 | PP/PU 50/50 | 5 | 50 | 26.7 | 79.7 | 63.3 | XMD | 125 | 53.2[1] | 49.2 |
| Cntl II | PU | — | 50 | 25.4 | 125 | 30.5 | MD | 90 | 30.5 | 26.8 |
| Cntl I | PP | — | 50 | 25.4[2] | — | — | MD | — | — | — |
| 32 | PP/PU 25/75 | 3 | 50 | 26.5 | 79.8 | 51.2 | MD | 90 | 51.2 | 33.5 |
| 32 | PP/PU 25/75 | 3 | 50 | 27.0 | 133.0 | 64.2 | MD | 90 | 64.2 | 36.8 |
| 33 | PP/PU 50/50 | 3 | 50 | 26.5 | 79.8 | 54.1 | MD | 90 | 54.1 | 34.4 |
| 33 | PP/PU 50/50 | 3 | 50 | 27.0 | 133.0 | 77.1 | MD | 90 | 77.1 | 52.3 |
| 3 | PP/PU 25/75 | 5 | 50 | 26.5 | 79.8 | 57.0 | MD | 90 | 57.0 | 42.2 |
| 3 | PP/PU 25/75 | 5 | 50 | 27.0 | 133.0 | 88.4 | MD | 90 | 88.4 | 56.3 |
| 2 | PP/PU 50/50 | 5 | 50 | 26.5 | 79.8 | 63.4 | MD | 90 | 63.4 | 50.3 |
| 2 | PP/PU 50/50 | 5 | 50 | 27.0 | 133.0 | 100.0 | MD | 90 | 100.0 | 77.2 |
| 34 | PP/PU 25/75 | 5 | 75 | 26.5 | 79.8 | 50.3 | MD | 90 | 50.3 | 36.8 |
| 34 | PP/PU 25/75 | 5 | 75 | 27.0 | 133.0 | 87.5 | MD | 90 | 87.5 | 52.5 |
| 6 | PP/PU 25/75 | 5 | 100 | 26.5 | 79.8 | 53.4 | MD | 90 | 53.4 | 39.4 |
| 6 | PP/PU 25/75 | 5 | 100 | 27.0 | 133.0 | 80.0 | MD | 90 | 80.0 | 47.7 |
| 34 | PP/PU 25/75 | 5 | 155 | 26.5 | 79.8 | 54.3 | MD | 90 | 54.3 | 39.4 |
| 34 | PP/PU 25/75 | 5 | 155 | 27.0 | 133.0 | 80.0 | MD | 90 | 80.0 | 47.7 |

[1] A delay of 24 hrs. between measuring the initial recovery length and the annealing experiment allowed further relaxation of the BMF web and additional recovery to occur.
[2] Polypropylene BMF was inelastic and broke on attempted elongation.

EXAMPLE 36

Figure 5:
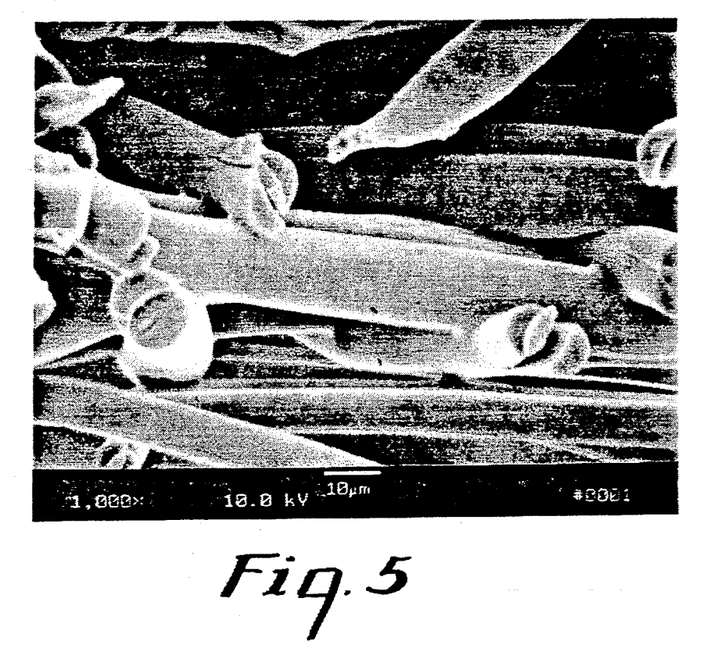
FIG. 5 is a scanning electron micrograph (SEM) of a web cross section for Example 36.

A BMF web was prepared according to the procedure of Example 8 except that the PE and PU melt stream were delivered to a three-layer feedblock. The samples were prepared for SEM analysis by standard techniques, FIG. 5(1000×).

EXAMPLE 37

A BMF web having a basis weight of 50 g/m² comprising two layer microfibers was prepared according to the procedure of Example 8 except that a wetting agent concentrate (polyethylene and Plutonic ™ L-64, available from Dow Chemical Co.) was blended into the polyethylene feed in a ratio of 25:75 and the web was collected at approximately 38 cm (15 inches).

Figure 8:
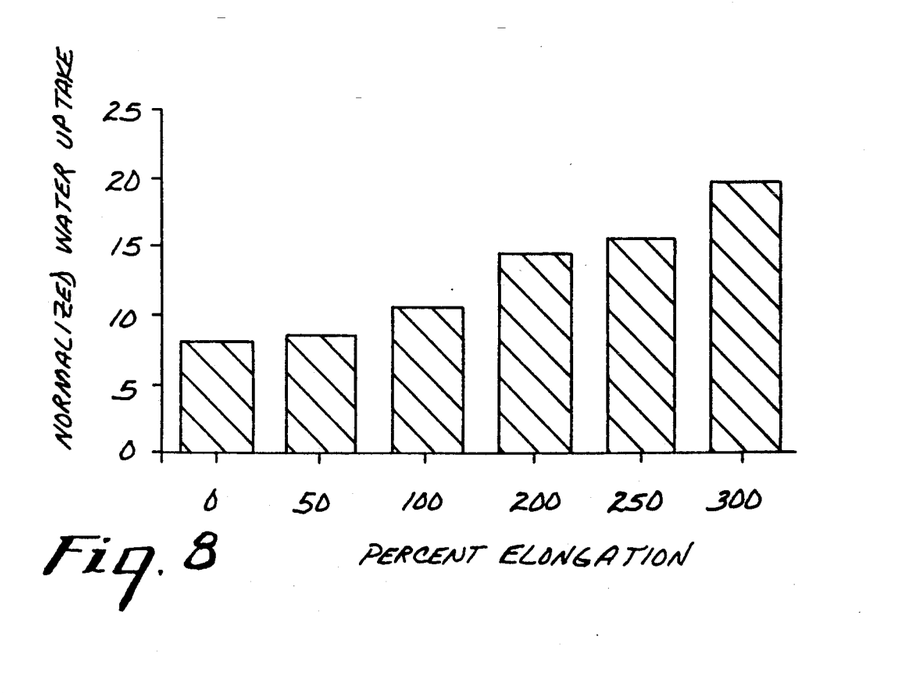
FIG. 8 is a plot of the normalized water uptake versus elongation for the web of Example 37.

The web was then stretched to various elongations and the water uptake was measured. The results are plotted in FIG. 8 where the verticle axis represents the amount of water absorbed normalized to the original web weight. As can be seen the water uptake for the unstretched web is approximately 8 times the original web weight while for the 300% stretched web the uptake is 20 times the original web weight. Percent elongation is on the horizontal axis.

The various modifications and alterations of this invention will be apparent to those skilled in the art without departing from the scope and spirit of this invention and this invention should not be restricted to that set for herein for illustrative purposes.

We claim:

1. An absorbent wipe comprising a melt-blown nonwoven web comprising melt-blown microfibers, each of said melt-blown microfibers having at least two substantially continuous layers throughout said microfiber length comprised of at least one first layer of an elastomeric material and at least one second layer of a relatively nonelastic higher modulus material capable of undergoing substantial permanent deformation wherein the web has been stretched and allowed to recover so that it has 120% of the absorptive capacity of a corresponding unstretched web.

2. The absorbent wipe of claim 1 wherein certain of the microfibers having at least two substantially continuous layers are crimped, the at least one second layer of a relatively nonelastic higher modulus material of said crimped microfibers being oriented.

3. The absorbent wipe of claim 1 wherein the microfiber average diameter is less than 10 micrometers.

4. The absorbent wipe of claim 1 wherein the web thickness is at least 150% that of an unstretched web.

5. The absorbent wipe of claim 1 wherein one or both layers contains a surfactant.

6. The absorbent wipe of claim 1 further comprising outer layers of a spun-bond nonwoven web.

7. The absorbent wipe of claim 1 further wherein the absorptive capacity is 130% that of a corresponding unstretched web.

8. The absorbent wipe of claim 1 wherein the absorptive capacity is 200% that of a corresponding unstretched web.

* * * * *

UNITED STATES PATENT AND TRADEMARK OFFICE
CERTIFICATE OF CORRECTION

PATENT NO. : 5,258,220
DATED : November 2, 1993
INVENTOR(S) : Joseph et al.

It is certified that error appears in the above-identified patent and that said Letters Patent is hereby corrected as shown below:

Column 2, line 59, delete "4,375,728" and insert --4,375,718--.

Signed and Sealed this

Third Day of May, 1994

Attest:

BRUCE LEHMAN

Attesting Officer

Commissioner of Patents and Trademarks